United States Patent
Lin et al.

(10) Patent No.: US 12,454,084 B2
(45) Date of Patent: Oct. 28, 2025

(54) TRAY TABLES COMPRISING PLANT FIBERS AND METHODS FOR MANUFACTURING TRAY TABLES COMPRISING PLANT FIBERS

(71) Applicants: The Boeing Company, Arlington, VA (US); Beijing Aircraft Technology Research Institute (BATRI) of COMAC, Ltd., Beijing (CN)

(72) Inventors: Jun Lin, Jinan (CN); Xiaoling Li, Beijing (CN); Zhao Wang, Beijing (CN); Ji Shengcheng, Beijing (CN); Xin Jiang, Beijing (CN); Li Dongsheng, Beijing (CN)

(73) Assignees: The Boeing Company, Arlington, VA (US); Beijing Aircraft Technology Research Institute (BATRI) of COMAC, Ltd., Beijing (CN)

( * ) Notice: Subject to any disclaimer, the term of this patent is extended or adjusted under 35 U.S.C. 154(b) by 156 days.

(21) Appl. No.: 18/345,172

(22) Filed: Jun. 30, 2023

(65) Prior Publication Data

US 2024/0383178 A1    Nov. 21, 2024

(51) Int. Cl.
    *B29C 45/14* (2006.01)
    *B29B 9/10* (2006.01)
    (Continued)

(52) U.S. Cl.
    CPC ......... *B29C 45/14795* (2013.01); *B29B 9/10* (2013.01); *B29B 9/14* (2013.01);
    (Continued)

(58) Field of Classification Search
None
See application file for complete search history.

(56) References Cited

U.S. PATENT DOCUMENTS 4,073,773 A * 2/1978 Banucci ............ C08G 73/1028
                                                             528/211
4,180,536 A * 12/1979 Howell, Jr. ............ C08J 9/142
                                                             131/345

(Continued)

FOREIGN PATENT DOCUMENTS

| CN | 114833989 | 8/2022 |
| CN | 117659650 A | 3/2024 |

OTHER PUBLICATIONS

Gao et al, "A review of the recent developments in flame-retardant nylon composites", Composites Part C: Open Access, www.sciencedirect.com/journal/composites-part-c-open-access, 23 pages. (Year: 2022).*

(Continued)

*Primary Examiner* — Emmanuel S Luk
(74) *Attorney, Agent, or Firm* — Walters & Wasylyna LLC

(57) ABSTRACT

The disclosure relates to a method for manufacturing a tray table containing plant fiber and a tray table made therefrom. The manufacturing method comprises: a) homogenizing a halogen-free flame retardant to obtain a homogeneous halogen-free flame retardant; b) melting a thermoplastic resin and uniformly blending the molten thermoplastic resin with a plant fiber, the homogeneous halogen-free flame retardant, and a compatibilizer to obtain a plant fiber composite material; c) extruding and granulating the plant fiber composite material to obtain a granular composite material; and d) mixing the granular composite material with a foaming agent and injection molding to obtain the tray table. The tray table manufactured according to the method herein is green and environmentally friendly, non-toxic and harmless, and also has high flame-retardant effect and weight reduction effect.

20 Claims, 3 Drawing Sheets

(51) Int. Cl.

| | | |
|---|---|---|
| *B29B 9/14* | (2006.01) | |
| *B29C 45/00* | (2006.01) | |
| *B29K 23/00* | (2006.01) | |
| *B29K 67/00* | (2006.01) | |
| *B29K 77/00* | (2006.01) | |
| *B29K 105/00* | (2006.01) | |
| *B29K 105/04* | (2006.01) | |
| *B29K 105/12* | (2006.01) | |
| *B29K 311/10* | (2006.01) | |
| *B29K 509/00* | (2006.01) | |
| *B29L 31/44* | (2006.01) | |

(52) U.S. Cl.
CPC ...... *B29C 45/0001* (2013.01); *B29C 45/0005* (2013.01); *B29K 2023/00* (2013.01); *B29K 2067/046* (2013.01); *B29K 2077/00* (2013.01); *B29K 2105/0026* (2013.01); *B29K 2105/041* (2013.01); *B29K 2105/12* (2013.01); *B29K 2105/251* (2013.01); *B29K 2311/10* (2013.01); *B29K 2509/00* (2013.01); *B29K 2995/0016* (2013.01); *B29L 2031/448* (2013.01)

(56) References Cited

U.S. PATENT DOCUMENTS

| | | | | |
|---|---|---|---|---|
| 4,668,717 A | * | 5/1987 | Lemstra | B29C 48/865 |
| | | | | 523/322 |
| 4,852,940 A | * | 8/1989 | Kanigowski | B64D 11/06 |
| | | | | 297/145 |
| 5,358,675 A | * | 10/1994 | Campbell | B29C 44/3469 |
| | | | | 264/DIG. 13 |
| 5,594,074 A | * | 1/1997 | Hwo | C08K 5/14 |
| | | | | 525/387 |
| 6,465,552 B1 | * | 10/2002 | Chorvath | C08L 83/04 |
| | | | | 524/323 |
| 2005/0215672 A1 | * | 9/2005 | Mohanty | B29B 9/06 |
| | | | | 524/9 |
| 2008/0193774 A1 | * | 8/2008 | Stone | A43B 7/144 |
| | | | | 264/250 |
| 2009/0043034 A1 | * | 2/2009 | Ishiduka | C08L 35/06 |
| | | | | 524/451 |
| 2013/0030066 A1 | * | 1/2013 | Hahn | C07F 9/34 |
| | | | | 521/85 |
| 2013/0068990 A1 | * | 3/2013 | Eilbracht | F16L 59/065 |
| | | | | 252/62 |
| 2015/0094409 A1 | * | 4/2015 | Kenny | B29C 70/52 |
| | | | | 524/100 |
| 2016/0052927 A1 | * | 2/2016 | Pfaendner | C07D 207/46 |
| | | | | 548/520 |
| 2017/0107375 A1 | * | 4/2017 | Pfaendner | C08L 79/04 |
| 2017/0260366 A1 | * | 9/2017 | Pfaendner | C09K 21/12 |
| 2017/0267806 A1 | * | 9/2017 | Goeschel | C08G 18/225 |
| 2017/0342239 A1 | * | 11/2017 | Ni | C08K 3/22 |
| 2018/0142156 A1 | * | 5/2018 | Cha | C09K 21/10 |
| 2020/0216647 A1 | * | 7/2020 | Xu | C09J 123/06 |
| 2020/0270415 A1 | * | 8/2020 | Weisse | C08J 9/0066 |
| 2021/0246373 A1 | * | 8/2021 | Kokura | C09K 21/04 |
| 2021/0332240 A1 | * | 10/2021 | Nakai | C08J 5/045 |
| 2022/0105708 A1 | * | 4/2022 | Meyer | B32B 5/02 |
| 2024/0067821 A1 | * | 2/2024 | Buzinkai | B29C 43/003 |
| 2024/0166839 A1 | * | 5/2024 | Eastep | C08K 3/016 |

OTHER PUBLICATIONS

CN117659650A, machine translation from Google Patents, 7 pages. (Year: 2025).*

* cited by examiner

TRAY TABLES COMPRISING PLANT FIBERS AND METHODS FOR MANUFACTURING TRAY TABLES COMPRISING PLANT FIBERS

PRIORITY

This application claims priority from Chinese Pat. App. No. 2023105681412 filed on May 18, 2023.

FIELD

This application relates to bio-based composite materials and associated manufacturing methods and, more specifically, to tray tables comprising plant fibers and methods for manufacturing tray tables comprising plant fibers.

BACKGROUND

Artificial/synthetic fibers are widely used as the reinforcing phase of fiber-reinforced composite materials. However, the production of artificial/synthetic fibers has been known to consume large quantities of natural resources and energy.

Plant fibers offer an alternative to artificial/synthetic fibers. Plant fibers can exhibit desirable properties, such as strength and modulus, yet plant fibers are relatively low cost, renewable, degradable, and environment-friendly. Unfortunately, the high flammability of the plant fiber-reinforced composite materials has limited their application.

Traditionally, halogen-containing flame retardants are used to improve the flame-retardant performance of materials. However, there is growing concern about the chemical compounds that are released when materials comprising halogen-containing flame retardants undergo combustion.

Foam is a type of polymeric material that includes a large quantity of pores defined by the polymer. Foam materials can be advantageous because of their light weight and functional properties, such as heat insulation, sound insulation, buffer and adsorption, and the like. However, there is also growing concern about the traditional chemical foaming agents used to produce polymeric foam materials.

Accordingly, those skilled in the art continue with research and development efforts in the field of fiber-reinforced composite materials.

SUMMARY

Disclosed are methods for manufacturing tray tables comprising plant fiber-reinforced thermoplastic composite materials.

In one example, the disclosed method for manufacturing tray tables includes (a) homogenizing a halogen-free flame retardant to obtain a homogeneous halogen-free flame retardant; (b) blending a molten thermoplastic resin with plant fibers, the homogeneous halogen-free flame retardant, and a compatibilizer to obtain a plant fiber composite material; (c) extruding the plant fiber composite material to obtain a granular composite material; (d) mixing the granular composite material with a foaming agent to obtain a foamable granular mixture; and (e) injection molding the foamable granular mixture to obtain the tray table.

Also disclosed are tray tables comprising plant fiber-reinforced thermoplastic composite materials.

In one example, the disclosed tray table is produced by a method that includes steps of (a) homogenizing a halogen-free flame retardant to obtain a homogeneous halogen-free flame retardant; (b) blending a molten thermoplastic resin with plant fibers, the homogeneous halogen-free flame retardant, and a compatibilizer to obtain a plant fiber composite material; (c) extruding the plant fiber composite material to obtain a granular composite material; (d) mixing the granular composite material with a foaming agent to obtain a foamable granular mixture; and (e) injection molding the foamable granular mixture to obtain the tray table.

In another example, the disclosed tray table includes a foamed body that includes a plant fiber-reinforced thermoplastic composite material, the plant fiber-reinforced thermoplastic composite material includes about 59.1 to about 74.2 parts by weight thermoplastic resin; about 3 to about 10 parts by weight plant fibers; about 15 to about 25 parts by weight of halogen-free flame retardant; and about 0.3 to about 0.9 parts by weight compatibilizer.

In yet another example, the disclosed tray table includes a plant fiber-reinforced thermoplastic composite material, wherein the plant fiber-reinforced thermoplastic composite material is foamed, and wherein the plant fiber-reinforced thermoplastic composite material is substantially free of halogen-containing flame retardants.

Other examples of the disclosed tray tables and methods for manufacturing tray tables will become apparent from the following detailed description, the accompanying drawings and the appended claims.

BRIEF DESCRIPTION OF THE DRAWINGS

The accompanying drawings, which form a part of the application, are used to provide a further understanding of the disclosure. The illustrative examples of the disclosure and their descriptions are used to explain the disclosure, and do not constitute an improper limitation thereto. In the accompanying drawings.

DETAILED DESCRIPTION

According to the technical solution of the present disclosure, methods for manufacturing tray tables comprising plant fibers is provided. The tray tables may be manufactured by melting and blending a certain weight ratio of thermoplastic resin, plant fibers, halogen-free flame retardant, and compatibilizer, followed by foaming to prepare a micro-foaming halogen-free flame retardant composite material. The resulting tray tables provides advantages, such as safety and environmental protection, high flame-retardant performance, lightweight, and excellent strength.

Figure 1A:
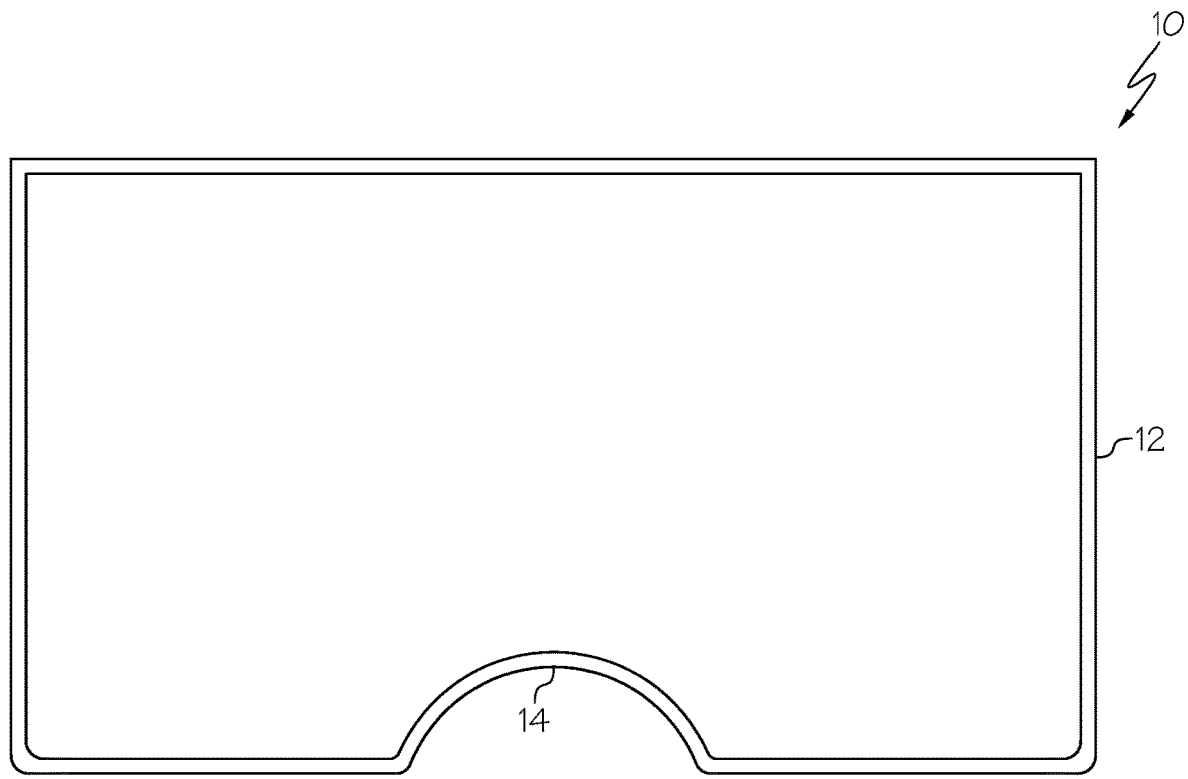
FIG. 1A is a top view of an example tray table manufactured in accordance with the present disclosure.
Figure 1B:
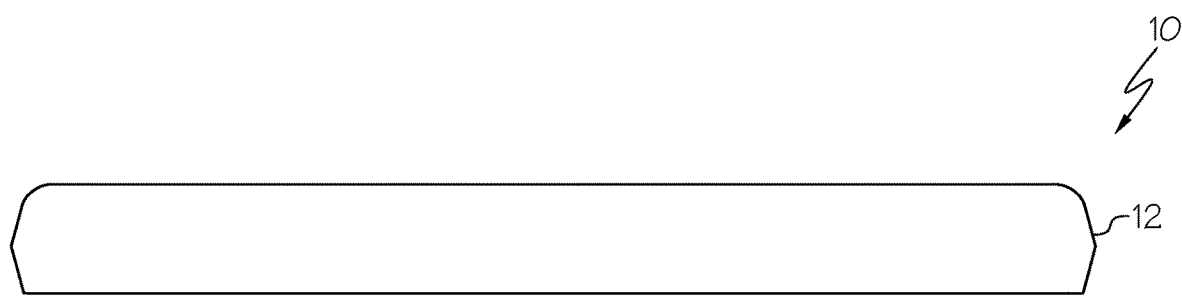
FIG. 1B is a side view of the tray table of FIG. 1A.

Referring to FIGS. 1A and 1B, disclosed are tray tables, generally designated 10. The disclosed tray tables 10 may be used in the aviation field, for example, as an airplane tray table in a commercial passenger airplane.

The disclosed tray table 10 has a foamed body 12, which can come in various shapes and configurations, as is known in the art. A tray table 10 having a generally rectangular foamed body 12, as shown in FIG. 1A is just one specific, non-limiting example of the disclosed tray tables of the present disclosure. Also, the indent portion 14 of the foamed body 12 of the tray table 10 shown in FIG. 1A is just a non-limiting example feature. Tray tables without indent portions 14 are also contemplated.

The foamed body 12 of the tray table 10 includes a plant fiber-reinforced thermoplastic composite material that has been foamed (i.e., a foamed, plant fiber-containing composite material). The plant fiber-reinforced thermoplastic composite material may include thermoplastic resin; plant fibers; halogen-free flame retardant; and compatibilizer. Particular advantages may be gained by controlling the weight ratio of the thermoplastic resin, the plant fibers, the halogen-free flame retardant, and the compatibilizer, particularly by selecting the halogen-free flame retardant as one or more of aluminum diethyl hypophosphite, melamine urate, and nanometer silicon dioxide.

In one example, the plant fiber-reinforced thermoplastic composite material includes 59.1-74.2 parts by weight of thermoplastic resin; 3-10 parts by weight of plant fibers; 15-25 parts by weight of halogen-free flame retardant; and 0.3-0.9 parts by weight of compatibilizer.

In some examples, the plant fibers may be selected from one or more of ramie, flax, jute, sisal, kenaf, and bamboo fiber. For example, the plant fiber is ramie, flax, jute, sisal, kenaf, or bamboo fiber. Compared to known plant fibers, the use of plant fibers within the scope of the disclosure can further improve the lightweight properties of the fiber composite material, as well as the mechanical properties, such as tensile strength of the plant fiber composite material, and reduce the damage of halogen-free flame retardant to the mechanical properties such as tensile strength of the composite material.

In some examples, the plant fiber is chopped fiber with an average length of 4 mm-10 mm. For example, the plant fibers have an average length of 4 mm, 5 mm, 6 mm, 7 mm, 8 mm, 9 mm, and 10 mm, etc. When the average length of the plant fibers falls within the scope of the disclosure, the plant fibers may be more uniformly mixed with the composite matrix (e.g., a substantially uniform mixture), thereby further improving the mechanical properties, such as tensile strength, of the plant fiber composite material.

In some examples, the composite material has an increased tensile strength. For example, the composite material has a tensile strength of from 50 MPa to 70 MPa, or from 50 MPa to 65 MPa or from 51 MPa to 62 MPa.

In some examples, the thermoplastic resin is selected from one or more of polyethylene, polypropylene, polyamide, and polylactic acid. For example, the thermoplastic resin is polyethylene, polypropylene, polyamide, or polylactic acid. More preferably, the thermoplastic resin is polylactic acid. Compared to known thermoplastic resins, the use of the thermoplastic resin within the scope of the disclosure can achieve good melting effect at the operating temperature of the internal mixer, improve the uniformity of the molten mixture, and further contribute to the good balance of flame-retardant performance, safety, lightweight properties and mechanical properties of the plant fiber composite material.

In some examples, the halogen-free flame retardant is a single flame retardant of diethyl aluminum hypophosphate or melamine urate. For example, the halogen-free flame retardant is diethyl aluminum hypophosphate, or the halogen-free flame retardant is melamine urate. In some examples, the halogen-free flame retardant is a binary compounding flame retardant of aluminum diethyl hypophosphite and melamine urate, and the weight ratio of aluminum diethyl hypophosphite to melamine urate is 1:1. In some examples, the halogen-free flame retardant is a ternary compounding flame retardant of aluminum diethyl hypophosphite, melamine urate and nanometer silicon dioxide, and the weight ratio of aluminum diethyl hypophosphite, melamine urate and nanometer silicon dioxide is 1:1:1. Compared to known halogen-free flame retardants, the use of the halogen-free flame retardant within the scope of the disclosure can further improve the flame retardant effect of the plant fiber composite material.

In some examples, the compatibilizer is triglycidyl isocyanurate. Compared to known compatibilizers, the use of the compatibilizer within the scope of the disclosure can further reduce the damage of the halogen-free flame retardant to the mechanical properties such as tensile strength of the composite material, thereby further improving the mechanical properties such as tensile strength of the plant fiber composite material.

Also disclosed are methods for manufacturing tray tables. In one example, the disclosed method includes: a) homogenizing the halogen-free flame retardant to obtain a homogeneous halogen-free flame retardant; b) melting the thermoplastic resin and uniformly blending the molten thermoplastic resin with the plant fiber, the homogeneous halogen-free flame retardant, and the compatibilizer to obtain the plant fiber composite material; c) extruding and granulating the plant fiber composite material to obtain a granular composite material; and d) mixing the granular composite material with a foaming agent and injection molding to obtain the tray table.

According to the method disclosed herein, by melting and blending a certain weight ratio of plant fiber, thermoplastic resin, halogen-free flame retardant, and compatibilizer, and followed by foaming, a micro-foaming halogen-free flame retardant composite material is prepared, the composite material is not only green and environmentally friendly, non-toxic and harmless, naturally degradable, but also has high flame-retardant performance and lightweight effect, and the compromises made by using halogen-free flame retardant to the mechanical properties, such as tensile strength of composite material, can also be reduced by the addition of plant fiber and compatibilizer.

Figure 2:
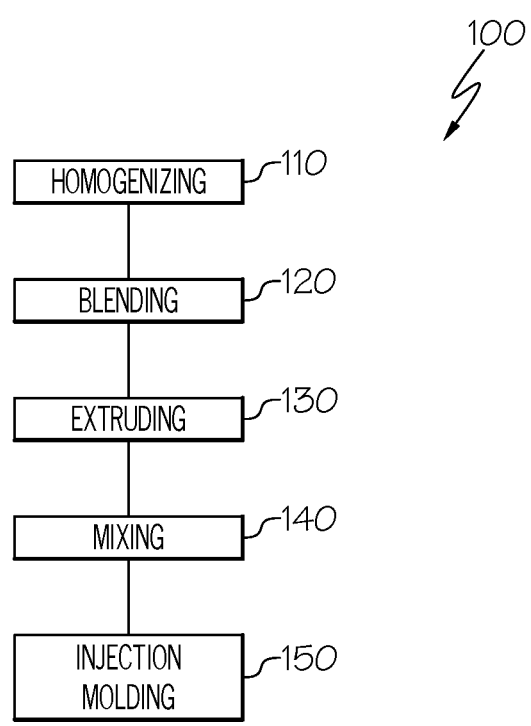
FIG. 2 is a flow diagram depicting an example of the disclosed method for manufacturing a tray table.

Referring to FIG. 2, in another example, the disclosed method, generally designated 100, includes (a) homogenizing (Block 110) a halogen-free flame retardant to obtain a homogeneous halogen-free flame retardant; (b) blending (Block 120) a molten thermoplastic resin with plant fibers, the homogeneous halogen-free flame retardant, and a compatibilizer to obtain a plant fiber composite material; (c) extruding (Block 130) the plant fiber composite material to obtain a granular composite material; (d) mixing (Block 140) the granular composite material with a foaming agent to obtain a foamable granular mixture; and (e) injection molding (Block 150) the foamable granular mixture to obtain the tray table.

In some examples, the blending (Block 120) is carried out in an internal mixer. For example, internal mixer may be set with an internal mixing time of 10-15 minutes, a rotational speed of 30-60 r/min, and an internal mixing temperature of 160-180° C. For example, the internal mixing time may be 10 min, 11 min, 12 min, 13 min, 14 min or 15 min, etc. For example, the rotational speed may be 30 r/min, 40 r/min, 50 r/min, or 60 r/min, etc. For example, the internal mixing temperature may be 160° C., 170° C., or 180° C., etc. When the internal mixing time, rotate speed, and internal mixing temperature are within the scope of the disclosure, the mixing speed of the materials in the internal mixer can be increased, saving mixing time and energy input, and helping to improve the homogeneity of the mixed materials, thereby further helping to balance the various properties of the obtained plant fiber composite material.

In some examples, extruding (Block 130) may be carried out in a single screw extruder. For example, the single screw extruder may have a first zone temperature of 140-160° C., a second zone temperature of 150-175° C., a third zone temperature of 150-170° C., and a head temperature of 140-165° C., and a residence time of 1-2 minutes for the plant fiber composite material in the single screw extruder. When the temperature of each section of the single screw extruder is within the scope of the disclosure, it can further improve the foaming speed, save energy input and cost, and help to improve the micro-foaming effect of halogen-free flame-retardant composite material, thereby further improving the lightweight properties of the micro-foaming halogen-free flame-retardant composite material.

In some examples, the mixing (Block 140) may include mixing a gas foaming agent with the granular composite material. For example, the gas foaming agent may be (or may include) $CO_2$ and/or $N_2$. When the foaming agent is within the scope of the disclosure, as physical foaming agents, gases such as $CO_2$ and $N_2$, etc., are non-toxic and harmless, rich in sources and low in price, and thus are ideal foaming agents which accord with the green production concept, and which helps to further improve the environmentally friendly properties of micro-foaming halogen-free flame-retardant composite materials.

Further, the disclosure comprises embodiments according to the following items:

Item 1. A plant fiber composite material, the plant fiber composite material comprises: 59.1-74.2 parts by weight of thermoplastic resin; 3-10 parts by weight of plant fiber; 15-25 parts by weight of halogen-free flame retardant; and 0.3-0.9 parts by weight of compatibilizer, wherein the halogen-free flame retardant comprises one or more selected from aluminum diethyl hypophosphite, melamine urate and nanometer silicon dioxide.

Item 2. The plant fiber composite material according to Item 1, wherein the plant fibers are selected from one or more of ramie, flax, jute, sisal, kenaf, and bamboo fiber.

Item 3. The plant fiber composite material according to Item 1 or Item 2, wherein the plant fibers are chopped fiber with an average length of 4 mm to 10 mm.

Item 4. The plant fiber composite material according to Item 1 or Item 2, the thermoplastic resin is selected from one or more of polyethylene, polypropylene, polyamide, and polylactic acid.

Item 5. The plant fiber composite material according to Item 1 or Item 2, the halogen-free flame retardant is a single flame retardant of aluminum diethyl hypophosphite or melamine urate.

Item 6. The plant fiber composite material according to Item 1 or Item 2, the halogen-free flame retardant is a binary compounding flame retardant of aluminum diethyl hypophosphite and melamine urate, wherein the weight ratio of aluminum diethyl hypophosphite to melamine urate is 1:1.

Item 7. The plant fiber composite material according to Item 1 or Item 2, the halogen-free flame retardant is a ternary compounding flame retardant of aluminum diethyl hypophosphite, melamine urate and nanometer silicon dioxide, wherein the weight ratio of aluminum diethyl hypophosphite, melamine urate and nanometer silicon dioxide is 1:1:1.

Item 8. The plant fiber composite material according to Item 1 or Item 2, the compatibilizer is triglycidyl isocyanurate.

Item 9. A tray table made of the plant fiber composite material as claimed in any one of Items 1 to 8.

The application will be further described in detail below in combination with specific examples, which cannot be understood as limiting the scope of protection claimed in the application.

The parts of components used in the following examples and comparative examples refer to the parts by weight of the corresponding components.

EXAMPLE 1

(1) The preparation process of halogen-free flame retardant: 5 parts of aluminum diethyl hypophosphite, 5 parts of melamine urate, and 5 parts of nanometer silicon dioxide were uniformly mixed to obtain a ternary compounding halogen-free flame retardant, and the weight ratio of aluminum diethyl hypophosphite, melamine urate and nanometer silicon dioxide in the ternary compounding flame retardant is 1:1:1.

(2) The preparation process of plant fiber composite material: 66.4 parts of polylactic acid resin was added to an internal mixer, and after it was molten, 3 parts of ramie fiber, 0.6 parts of triglycidyl isocyanurate (compatibilizer), and 15 parts of the ternary compounding halogen-free flame retardant obtained in step (1) were sequentially added thereto, which were molten and blended uniformly, then the plant fiber composite material was taken out, and then extruded and granulated through a single screw extruder to obtain a granular composite material. The internal mixing time in the single screw extruder was 12 min, the rotate speed was 50 r/min, and the internal mixing temperature was 170° C.; the temperature of each section of the single screw extruder was as follows: 145° C. for the first zone, 155° C. for the second zone, 155° C. for the third zone, and 145° C. for the head temperature.

Figure 3:
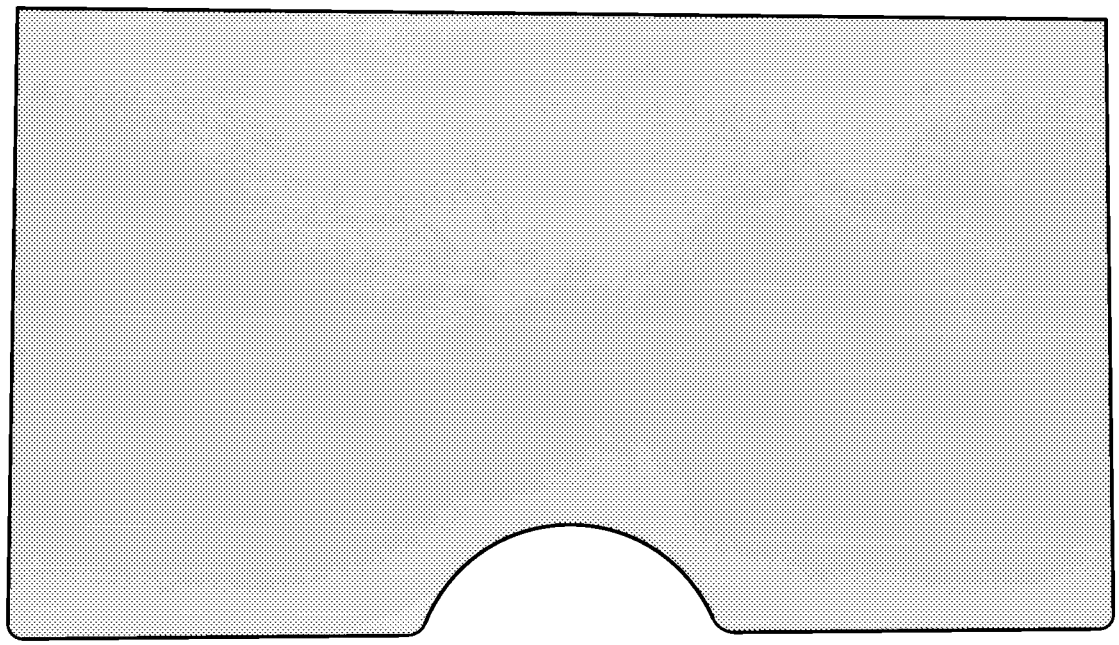
FIG. 3 is a photograph (top view) of an aviation tray table manufactured according to Example 1 of the present disclosure.

(3) The manufacturing process of an aviation tray table: 100 parts of the granular composite material obtained in step (2) was mixed with 0.4 parts of the physical foaming agent $N_2$ in a micro-foaming injection molding machine, and then injection molded into the aviation tray table. The temperature of each section of the micro-foaming injection molding machine was as follows: 25° C. at the blanking port (i.e., blanking port temperature), 170° C. at the feeding section (i.e., feeding section temperature), 185° C. at the compression section (i.e., compression section temperature), and 175° C. at the metering section (i.e., metering section temperature). The resulting tray table is shown in FIG. 3.

EXAMPLE 2

The aviation tray table was manufactured by the same method as Example 1, except that in step (2), the weight of each component added to the internal mixer was as follows: 74.2 parts of polylactic acid resin, 10 parts of ramie fiber, 0.9 parts of triglycidyl isocyanurate (compatibilizer), and 25 parts of the ternary compounding halogen-free flame retardant obtained in step (1).

EXAMPLE 3

The aviation tray table was manufactured by the same method as Example 1, except that in step (2), the weight of each component added to the internal mixer was as follows:

59.1 parts of polylactic acid resin, 3 parts of ramie fiber, 0.3 parts of triglycidyl isocyanurate (compatibilizer), and 15 parts of the ternary compounding halogen-free flame retardant obtained in step (1).

EXAMPLE 4

The aviation tray table was manufactured by the same method as Example 1, except that in step (1), 10 parts of aluminum diethyl hypophosphite and 10 parts of melamine urate were used as a binary compounding halogen-free flame retardant, and the weight ratio of aluminum diethyl hypophosphite to melamine urate was 1:1.

EXAMPLE 5

The aviation tray table was manufactured by the same method as Example 1, except that in step (1), 20 parts of aluminum diethyl hypophosphite was used as a halogen-free flame retardant, and no foaming agent was used for the foaming process in step (3).

Comparative Example 1

(1) The preparation process of polylactic acid resin: 100 parts of polylactic acid resin was added to an internal mixer, and after being internal mixed for a period of time, it was taken out, and then extruded and granulated through a single screw extruder to obtain a granular polylactic acid material. The internal mixing time in the single screw extruder was 12 min, the rotate speed was 50 r/min, and the internal mixing temperature was 170° C.; the temperature of each section of the single screw extruder was as follows: 145° C. for the first zone, 155° C. for the second zone, 155° C. for the third zone, and 145° C. for the head temperature.
(2) The manufacturing process of aviation tray table: 100 parts of the granular polylactic acid material obtained in step (1) was injection molded in an injection molding machine to obtain the aviation tray table. The temperature of each section of the injection molding machine was as follows: 25° C. at the blanking port, 170° C. at the feeding section, 185° C. at the compression section, and 175° C. at the metering section.

Comparative Example 2

The aviation tray table was manufactured by the same method as Example 1, except that in step (2), the weight of each component added to the internal mixer was as follows: 79.4 parts of polylactic acid resin, 30 parts of ramie fiber, and 0.6 parts of triglycidyl isocyanurate (compatibilizer).

Performance Testing

1. Tensile Performance Testing

According to the Standard GB/T 1040.1-2006, the tensile strengths of examples and comparative examples were measured on the HDW-2000 Model Microcomputer Controlled Rubber Tensile Testing Machine; the size of the test specimen strip was 75×10×2 mm$^3$, with a tensile rate of 10 mm/min, five specimens of each material were tested and the average values of which were calculated.

2. UL 94 Vertical Combustion Rating Test

According to the Standard GB/T 2408-2008, the UL 94 Vertical Combustion Ratings of examples and comparative examples were tested on a horizontal and vertical combustion tester (CZF-5), with a specimen size of 125×13×3 mm$^3$. Wherein, V0 indicates that after two 10-second combustion tests were carried out on the sample, the flame extinguished within 10 seconds; NC indicates that the sample burned until it was completely burned out during the combustion test, and the flame did not extinguish during the combustion process.

The results of tensile properties and flame retardant test of the composite materials are shown in Table 1 below. PLA represents polylactic acid, RF represents ramie fiber, A represents aluminum diethyl hypophosphite, M represents melamine urate, and S represents nanometer silicon dioxide. xAyMzS indicates that the parts by weight ratio of three flame retardants A, M, and S is x:y:z.

TABLE 1

| Composite material | | x:y:z | Tensile strength (MPa) | Average cell size (μm) | Weight-loss ratio (%) | UL 94 Rating |
|---|---|---|---|---|---|---|
| Example 1 | PLA/RF/AMS | 1:1:1 | 53.34 | 65.7 | 23.7 | V0 |
| Example 2 | PLA/RF/AMS | 1:1:1 | 59.11 | 70.9 | 26.2 | V0 |
| Example 3 | PLA/RF/AMS | 1:1:1 | 51.32 | 61.8 | 21.9 | V0 |
| Example 4 | PLA/RF/AM | 1:1 | 60.12 | 86.7 | 14.3 | V0 |
| Example 5 | PLA/RF/A | — | 39.55 | — | — | V2 |
| Comparative Example 1 | PLA | — | 55.89 | — | — | NC |
| Comparative Example 2 | PLA/RF | — | 71.31 | — | — | NC |

It can be seen from the above results that compared to a polylactic acid resin without containing a flame retardant, the flame retardant described herein can effectively improve the flame-retardant performance of the polylactic acid resin. More prominently, the ternary compounding flame retardant herein (aluminum diethyl hypophosphite, melamine urate, and nanometer silicon dioxide) increases the flame-retardant performance (i.e., UL 94 Rating is a plastics flammability standard) of the polylactic acid resin to the rating of V0. The addition of a plant fiber and a compatibilizer results in a slight decrease in the tensile strength of the polylactic acid resin after it is blended with a flame retardant, ensuring a sufficient support strength for the aviation tray table in use. The micro-foaming process significantly increases the weight-loss ratio of the composite material. The aviation tray table manufactured from the plant fiber composite material of the invention has higher strength, thereby successfully manufacturing a lightweight and high-strength aviation tray table.

The above examples are merely a description of the technical solutions of the disclosure, rather than a limitation to the scope of the disclosure. Although those ordinary skills in the art can make various modifications with reference to the above examples, they should fall within the scope of protection of the disclosure provided that they do not deviate from the design spirit of the disclosure.

It should be noted that the terms "first," "second," etc. in the specification and claims of the application are used to distinguish similar objects, and they are not necessary to be used to describe a specific order or a precedence order. It should be understood that the terms used in this way can be interchanged if appropriate, so that the embodiments described here can be implemented in an order other than those described here, for example.

The above contents only describe the preferred examples of the disclosure, and are not intended to limit the disclosure.

For those skilled in the art, various modifications and changes can be made to the disclosure. Any modifications, equivalent substitutions, improvements, and the like made within the spirit and principle of the disclosure shall be included within the scope of protection of the disclosure.

What is claimed is:

1. A method for manufacturing a tray table comprising:
   homogenizing a halogen-free flame retardant to obtain a homogeneous halogen-free flame retardant;
   blending a molten thermoplastic resin with plant fibers, the homogeneous halogen-free flame retardant, and a compatibilizer to obtain a plant fiber composite material;
   extruding the plant fiber composite material to obtain a granular composite material;
   mixing the granular composite material with a foaming agent to obtain a foamable granular mixture; and
   injection molding the foamable granular mixture to obtain the tray table.

2. The method of claim 1, wherein the blending is performed in an internal mixer.

3. The method of claim 2, wherein the blending is performed:
   at a rotational speed of about 30 to about 60 revolutions per minute,
   at an internal mixing temperature of about 160 to about 180° C., and
   for a mixing time of about 10 to about 15 minutes.

4. The method of claim 1, wherein the extruding is performed in a single screw extruder.

5. The method of claim 4, wherein the single screw extruder has a first zone temperature of about 140 to about 160° C., a second zone temperature of about 150 to about 175° C., a third zone temperature of about 150 to about 170° C., and a head temperature of about 140 to about 165° C., and a residence time of about 1 to about 2 minutes for the plant fiber composite material in the single screw extruder.

6. The method of claim 1 wherein the injection molding is carried out in a micro-foaming injection molding machine.

7. The method of claim 6 wherein the micro-foaming injection molding machine has a blanking port temperature of about 20 to about 45° C., a feeding section temperature of about 160 to about 175° C., a compression section temperature of about 175 to about 195° C., and a metering section temperature of about 170 to about 195° C.

8. The method of claim 1, wherein the foaming agent is a gas foaming agent and comprises at least one of $CO_2$ and $N_2$.

9. The method of claim 1, wherein the plant fibers comprise at least one of ramie, flax, jute, sisal, kenaf, and bamboo fiber.

10. The method of claim 1, wherein the plant fibers are chopped and have an average length between about 4 mm and about 10 mm.

11. The method of claim 1, wherein the molten thermoplastic resin comprises at least one of polyethylene, polypropylene, polyamide, and polylactic acid.

12. The method of claim 1, wherein the halogen-free flame retardant is a single flame retardant of aluminum diethyl hypophosphite or melamine urate.

13. The method of claim 1, wherein the halogen-free flame retardant is a binary compounding flame retardant comprising aluminum diethyl hypophosphite and melamine urate.

14. The method of claim 13, wherein a weight ratio of the aluminum diethyl hypophosphite to the melamine urate is about 1:1.

15. The method of claim 1, wherein the halogen-free flame retardant is a ternary compounding flame retardant comprising aluminum diethyl hypophosphite, melamine urate and nanometer silicon dioxide.

16. The method of claim 15, wherein a weight ratio of the aluminum diethyl hypophosphite, the melamine urate, and the nanometer silicon dioxide is about 1:1:1.

17. The method of claim 1, wherein the compatibilizer comprises triglycidyl isocyanurate.

18. A method of manufacturing a foamed article comprising:
   blending a molten thermoplastic resin with plant fibers, a homogeneous halogen-free flame retardant, and a compatibilizer to obtain a plant fiber composite material;
   extruding the plant fiber composite material to obtain a granular composite material;
   mixing the granular composite material with a foaming agent to form a foamable granular mixture; and
   injection molding the foamable granular mixture to obtain the foamed article.

19. The method of claim 18, wherein the foaming agent comprises at least one of $CO_2$ and $N_2$.

20. The method of claim 18, wherein the foamed article is a tray table.

* * * * *